Dec. 16, 1930.                    C. H. BLIVEN                    1,785,475
                                 SHUT-OFF VALVE
                             Filed April 12, 1928            2 Sheets-Sheet 1
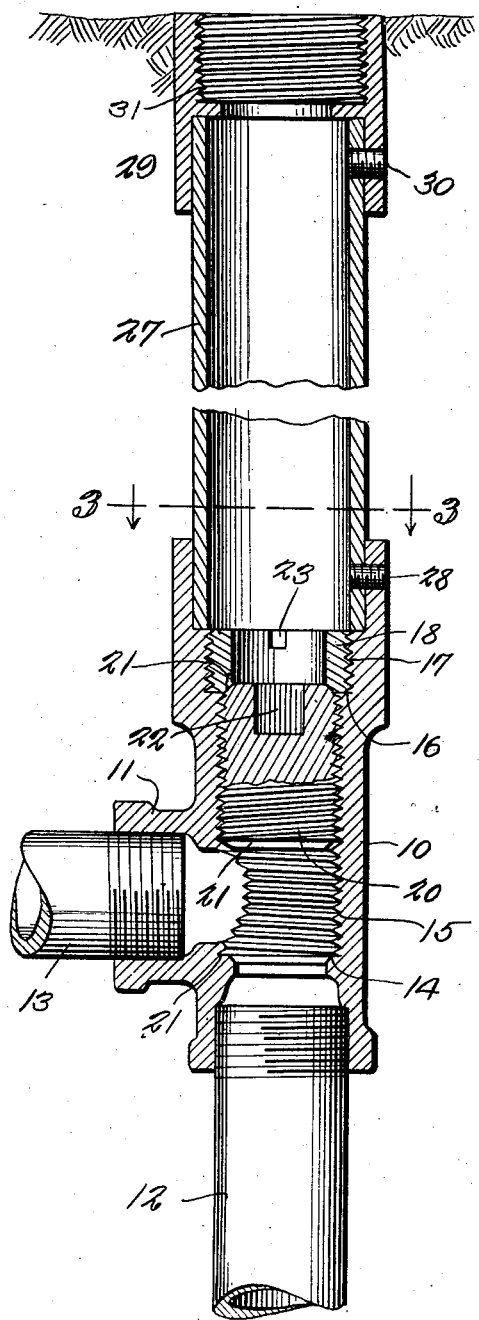
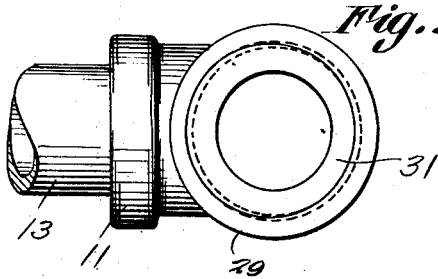
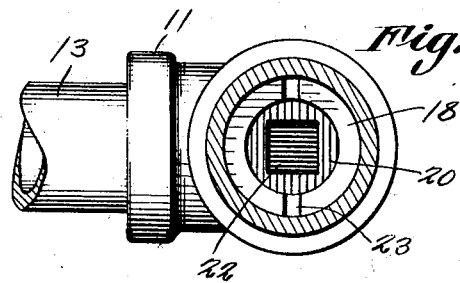
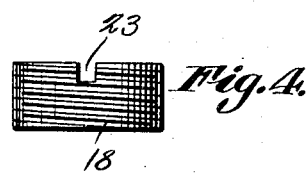
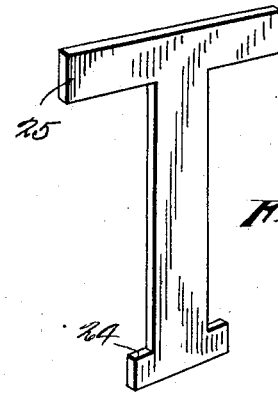
Inventor
Charles H. Bliven
By E. Walton Brewington
                Attorney Dec. 16, 1930. C. H. BLIVEN 1,785,475
SHUT-OFF VALVE
Filed April 12, 1928 2 Sheets-Sheet 2
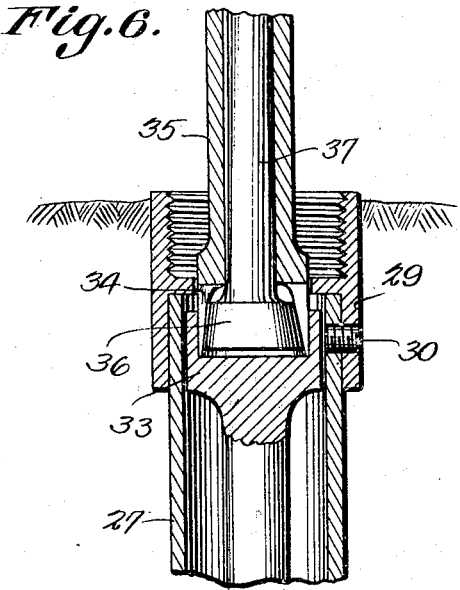
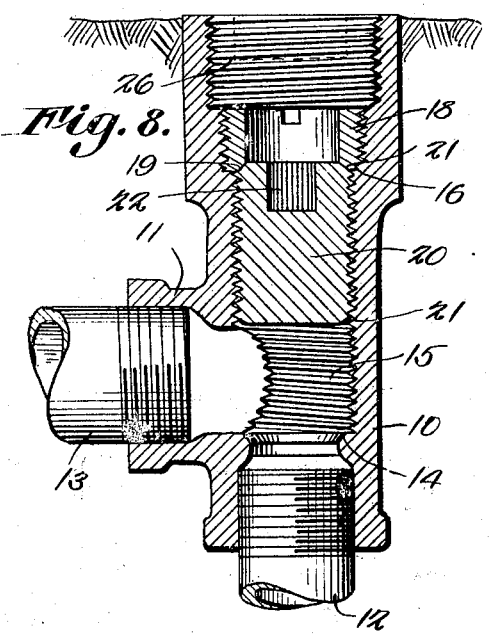
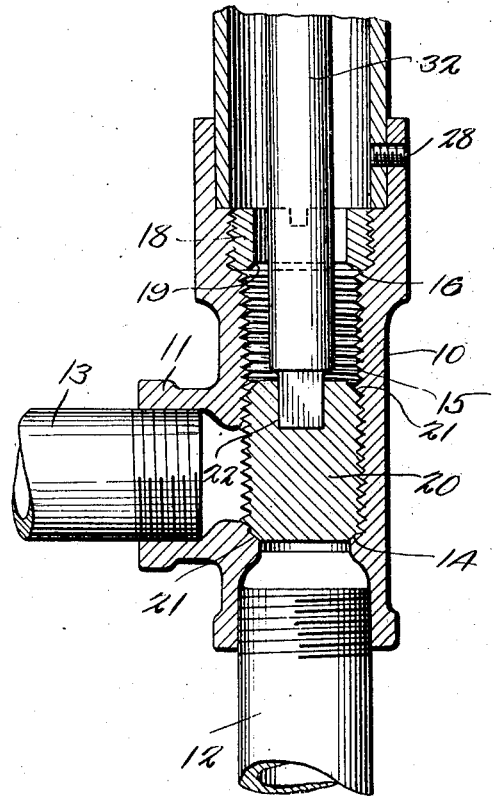

Patented Dec. 16, 1930

1,785,475

UNITED STATES PATENT OFFICE

CHARLES H. BLIVEN, OF NORFOLK, VIRGINIA

SHUT-OFF VALVE

Application filed April 12, 1928. Serial No. 269,381.

This invention relates to water distribution and has special reference to a house line shut-off valve.

In the carrying of connections from water mains into buildings it is customary to place in the so-called house line, in a place easy of access from outside the house, a controlling valve by which the water may be turned on to or off from the house by the water company, city authorities or others having control of the water supply.

One important object of the invention is to provide an improved, simple and economical form of valve for the above purpose which is of such character as to be practically impossible to get out of order, which is accessible from the ground or street level and which is so arranged as to prevent any leakage into the street box or access pipe through which the operating means for the valve, commonly termed "the key", is inserted.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a vertical section through one form of the valve wherein the arrangement is such that the valve itself is located well below the frost line.

Figure 2 is a plan view thereof.

Figure 3 is a section on the line 3—3 of Figure 1.

Figure 4 is a side elevation of a left hand threaded valve seat used herewith.

Figure 5 is a perspective view of one form of key adapted to be used herewith.

Figure 6 is a view similar to Figure 1 showing a modified form of valve actuating means in connection with the type of valve shown in Figure 1.

Figure 7 is a view showing a key for use with the modification shown in Figure 6.

Figure 8 is a view showing a modified arrangement wherein the house pipe lies close to the surface of the ground.

In the form shown in the various figures the body of the valve constitutes a T fitting having a vertical run 10 and a lateral branch 11. To the bottom end of the vertical run is screwed the supply pipe 12 and from the branch 11 extends the house pipe 13. Just above the upper end of the supply pipe 12 the vertical run is provided with an upwardly facing beveled valve seat 14 which lies slightly below the opening of the branch 11. From this valve seat there extends upwardly internal threads 15 which are here shown as right handed and these threads extend some distance above the opening of the branch 11. At the upper end of the threaded portion 15 the bore of the run 10 is enlarged to form a shoulder 16 and this enlarged portion is threaded internally with threads 17 which are here shown as left handed. It is to be noted that one of the important features of this invention is that the threads 15 and 17 shall be of opposite hands, but it is to be understood that it is not essential that the threads 15 shall be right handed and the threads 17 left handed since the threads 15 may be left handed provided that the threads 17 are made right handed. In the enlarged portion surrounded by the threads 17 there is screwed a sleeve 18 which rests against the shoulder 16 and has a downwardly facing valve seat 19 at its lower end. Screwed into the lower threaded portion of the run is a valve 20 having beveled ends 21 for engagement with the respective valve seats 14 and 19 accordingly as the valve 20 is screwed down or up. Now it will be observed that when the valve 20 is screwed up so that its upper end engages the valve seat 19 there is no tendency to unscrew the sleeve 18 carrying that valve seat because the threads on the sleeve are of opposite hand to the threads on the valve. The valve 20 is provided at its upper end with a suitable socket 22 for the key or operating means and similarly the seat ring 18 is provided with screw kerfs 23. For operating the valve and seat ring a T-shaped key may be used having an end 24 of proper proportions to fit across the ring 18 and into the kerfs 23 and also having an arm 25 for fitting into the socket 22.

In the form of the device shown in Figure 8 the top end of the T fitting is still further enlarged and internally threaded to receive a closure cap 26. In the form shown in Figures 1 and 6 a tubular extension 27 is secured in the top end of the T, which in this instance is unthreaded, by a threaded pin 28 and this extension fits into the lower end of the street box 29, being secured thereto by the screw 30. The street box, in this case, is provided with a threaded closing plug 31.

In the form shown in Figure 6 a permanent valve operating stem 32 has its lower end seated in the socket 22 and its recessed upper end 33 located in the upper end of the extension 27 so that the expansible lower end 34 of a key 35 may be inserted in the recess, the end 34 being expanded by the wedge cone 36. This wedge cone is on the lower end of a stem 37 for extension up through the hollow tubular portion of the key 35 and has a nut handle 38 fitted on its upper end to draw the cone upwardly or release the same as the handle is rotated.

Obviously when the valve 20 is screwed to its uppermost position it prevents any leakage of water into the street box while, when screwed down, it closes off both street box and house.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

A stop valve comprising a T coupling having a vertically disposed run and a lateral outlet arm intermediate its ends, the lower end of the vertical run being adapted to be connected with a supply pipe, an upwardly facing valve seat in said run below the outlet arm, an upper portion of the vertical run being of increased internal diameter to form a socket, the walls of the run being threaded in one direction between the valve seat and lower end of the socket and the walls of the socket being threaded in an opposite direction, an externally threaded ring screwed tightly into said socket and having its lower end shaped to define a valve seat exposed through the bottom of the socket, the upper portion of the ring being adapted for engagement by a wrench when inserting and removing the ring, and a threaded valve plug screwed into said run between the lower valve seat and socket, said plug being of less length than the distance between the outlet arm and socket but of greater depth than the diameter of the outlet arm and having its upper and lower ends formed with surfaces conforming to the valve seats of the run and ring and adapted to seat firmly against the seats to form tight closures, the upper end of the plug being adapted for engagement by an operating element passed downwardly through said ring.

In testimony whereof I affix my signature.

CHARLES H. BLIVEN.